US012717614B2

(12) United States Patent
Qiao et al.

(10) Patent No.: US 12,717,614 B2
(45) Date of Patent: Aug. 25, 2026

(54) SYSTEMS AND METHODS FOR COMPLETING TASKS

(71) Applicant: Citrix Systems, Inc., Fort Lauderdale, FL (US)

(72) Inventors: Zongpeng Qiao, Nanjing (CN); Wenshuang Zhang, Nanjing (CN); Ze Chen, Nanning (CN); Hao Lan, Nanjing (CN)

( * ) Notice: Subject to any disclaimer, the term of this patent is extended or adjusted under 35 U.S.C. 154(b) by 508 days.

(21) Appl. No.: 17/649,694

(22) Filed: Feb. 2, 2022

(65) Prior Publication Data

US 2023/0214264 A1 Jul. 6, 2023

Related U.S. Application Data

(63) Continuation of application No. PCT/CN2022/070451, filed on Jan. 6, 2022.

(51) Int. Cl.
*G06F 9/48* (2006.01)
*G06F 9/50* (2006.01)
(Continued)

(52) U.S. Cl.
CPC .............. *G06F 9/4881* (2013.01); *G06F 9/48* (2013.01); *G06F 9/4806* (2013.01);
(Continued)

(58) Field of Classification Search
CPC ........ G06F 9/48; G06F 9/4806; G06F 9/4843; G06F 9/4881; G06F 9/4887; G06F 9/50;
(Continued)

(56) References Cited

U.S. PATENT DOCUMENTS 10,817,782 B1 10/2020 Rando
2005/0216328 A1 9/2005 Clark
(Continued)

FOREIGN PATENT DOCUMENTS

CN 101155049 A 4/2008
CN 102385615 A 3/2012
(Continued)

OTHER PUBLICATIONS

International Search Report and Written Opinion issued in App. No. PCT/CN2022/070451, dated Oct. 10, 2022, 10 pages.
(Continued)

*Primary Examiner* — Charles M Swift

(57) ABSTRACT

In some embodiments, a method comprises: determining, by a computing device, a potential for tasks of one or more applications not to be completed at a given time, the one or more applications being hosted on remote computing devices; initiating, by the computing device, a call to one or more application programmable interfaces (APIs) of the remote computing devices to retrieve data about the one or more tasks from the one or more applications, the tasks being generated by the one or more applications and including a time of completion being that of the given time; and initiating, by the computing device, an update to at least one of the one or more applications using the retrieved data, so that at least one of the generated tasks is completed before or at the given time.

20 Claims, 11 Drawing Sheets

(51) Int. Cl.
*G06Q 10/107* (2023.01)
*G06Q 10/109* (2023.01)

(52) U.S. Cl.
CPC .......... *G06F 9/4843* (2013.01); *G06F 9/4887* (2013.01); *G06F 9/50* (2013.01); *G06F 9/5027* (2013.01); *G06Q 10/107* (2013.01); *G06Q 10/109* (2013.01)

(58) Field of Classification Search
CPC .... G06F 9/5027; G06Q 10/10; G06Q 10/107; G06Q 10/109
See application file for complete search history.

(56) References Cited

U.S. PATENT DOCUMENTS

2007/0244879 A1 10/2007 Clausner
2008/0313004 A1 12/2008 Ryan
2013/0097491 A1 4/2013 Shoya
2015/0033233 A1* 1/2015 Hosokawa .............. G06F 11/30 718/102
2015/0142800 A1 5/2015 Thapliyal
2015/0169788 A1 6/2015 Doganata
2015/0220888 A1 8/2015 Iyer
2015/0254597 A1* 9/2015 Jahagirdar ..... G06Q 10/063118 705/7.15
2016/0085590 A1* 3/2016 Yamasaki ............... G06F 11/32 718/104
2016/0329050 A1 11/2016 Godewyn
2017/0278038 A1 9/2017 Wu
2018/0018610 A1 1/2018 Del Balso
2018/0081505 A1* 3/2018 Ron .......................... G06F 9/54
2018/0081720 A1* 3/2018 Zlatanchev ........... G06F 9/4887
2018/0287987 A1 10/2018 Purian
2019/0258985 A1 8/2019 Daniek
2020/0257850 A1 8/2020 Carbune
2021/0019713 A1 1/2021 Vangala
2021/0073712 A1 3/2021 Fox
2021/0109744 A1 4/2021 Mamata
2022/0180323 A1* 6/2022 Di Sipio ........... G06F 18/21355
2022/0222606 A1* 7/2022 Tomizuka ............... G06T 11/00

FOREIGN PATENT DOCUMENTS

CN 102685130 A 9/2012
CN 102685227 A 9/2012
CN 103186847 A 7/2013
CN 103327087 A 9/2013
CN 108027738 A 5/2018
CN 108391079 A 8/2018
CN 109074555 A 12/2018
CN 111125086 A 5/2020
WO 2013095755 A2 6/2013

OTHER PUBLICATIONS

International Search Report and Written Opinion issued in App. No. PCT/CN2021/136316, mailing date Sep. 14, 2022, 10 pages.
International Search Report and Written Opinion issued in App. No. PCT/CN2021/136681, mailing date Sep. 7, 2022, 9 pages.
International Search Report and Written Opinion issued in App. No. PCT/CN2021/136954, mailing date Aug. 25, 2022, 9 pages.
International Search Report and Written Opinion for App. No. PCT/CN2021/085878, dated Jan. 4, 2022, 10 pages.
International Search Report and Written Opinion issued in App. No. PCT/CN2021/118120, mailing date Jun. 10, 2022, 9 pages.

* cited by examiner

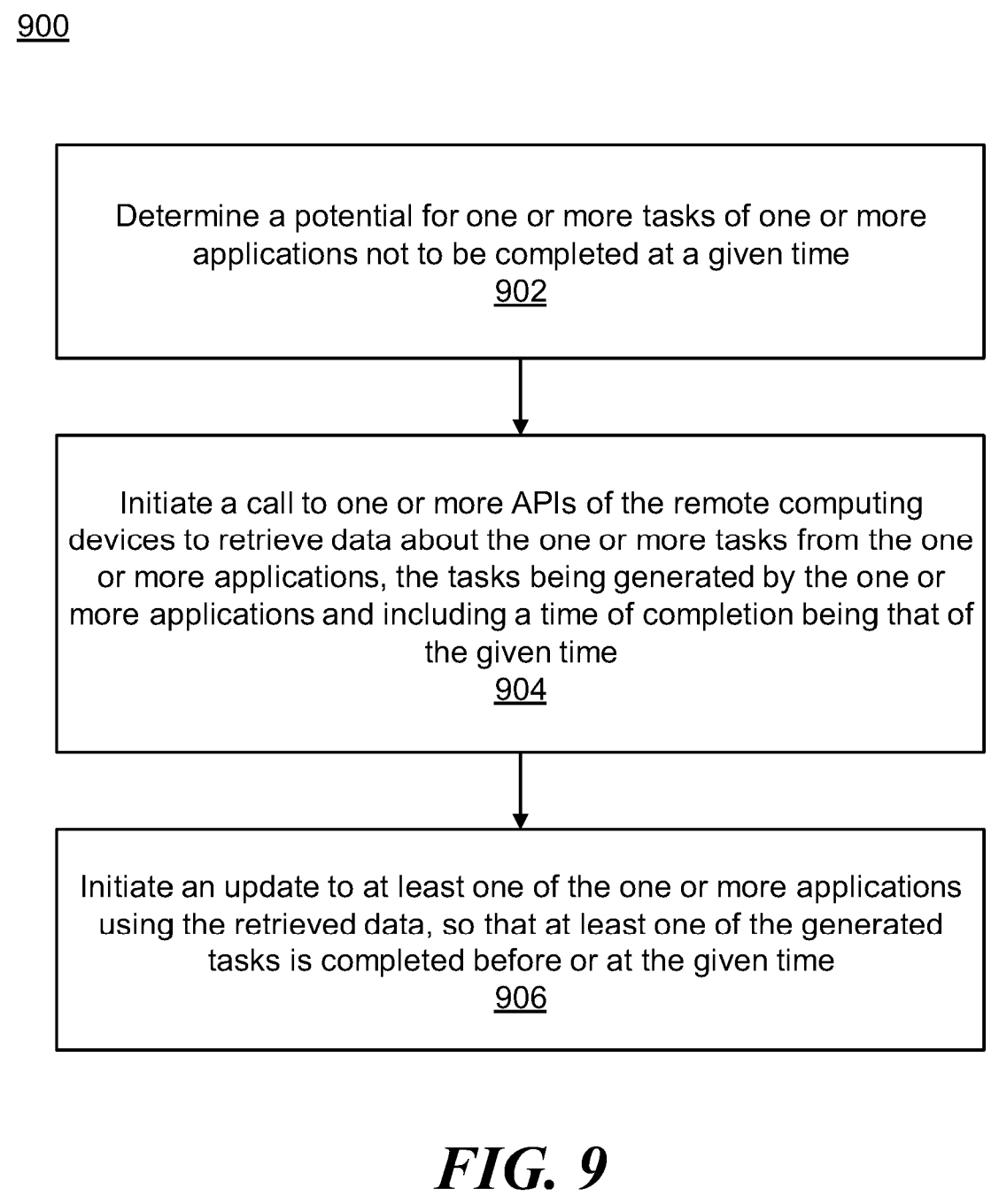

900

Determine a potential for one or more tasks of one or more applications not to be completed at a given time
902

Initiate a call to one or more APIs of the remote computing devices to retrieve data about the one or more tasks from the one or more applications, the tasks being generated by the one or more applications and including a time of completion being that of the given time
904

Initiate an update to at least one of the one or more applications using the retrieved data, so that at least one of the generated tasks is completed before or at the given time
906

*FIG. 9*

SYSTEMS AND METHODS FOR COMPLETING TASKS

CROSS REFERENCE TO RELATED APPLICATIONS

This application is a continuation of and claims the benefit of PCT Patent Application No. PCT/CN2022/070451 filed on Jan. 6, 2022 in the English language in the State Intellectual Property Office and designating the United States, the contents of which are hereby incorporated herein by reference in its entirety.

BACKGROUND

Various software applications and services allow tasks to be assigned to users. Over the course of a task's lifecycle, the task may be reassigned to different users, e.g., different users within the same company, enterprise, firm or other type of organization. For example, in project management software, a task (or "ticket") may be created by a project manager and initially assigned to a team leader, who in turn may in turn assign the task to a software engineer or developer. Some tasks may have a due date, meaning a date or time by which the task is expected to be completed. If user takes time off (e.g., if an employee takes paid time off), the user may be responsible for the completion of tasks that are due during that time.

SUMMARY

Before a user takes time off, a user may manually access several different applications to search for tasks that are coming due. For tasks that the user cannot complete prior to taking the time off, the user may identify other users (e.g., co-workers, team members, etc.) who are available to, and capable of, completing the tasks on time. Then, to reassign a task, the user may manually login to particular application and perform or more actions, which actions may vary from application to application. Such effort can be time consuming for the user and result in increased resource usage by computing devices used to host and access the several different applications.

According to one aspect of the disclosure, a method can include: determining, by a computing device, a potential for tasks of one or more applications not to be completed at a given time, the one or more applications being hosted on remote computing devices; initiating, by the computing device, a call to one or more application programmable interfaces (APIs) of the remote computing devices to retrieve data about the one or more tasks from the one or more applications, the tasks being generated by the one or more applications and including a time of completion being that of the given time; and initiating, by the computing device, an update to at least one of the one or more applications using the retrieved data, so that at least one of the generated tasks is completed before or at the given time.

In some embodiments, the given time may include a period of time, the determination of the potential for tasks of the one or more applications not to be completed at the given time may include determining a potential for tasks of the one or more applications not to be completed within the period of time, and the time of completion of the generated tasks may be within the period of time. In some embodiments, the determination of the potential for the one or more tasks not to be completed at the given time can include receiving information about a time off request made by a user. In some embodiments, the initiation of the call to the one or more APIs may include querying the one or more applications for tasks to be completed at the given time. In some embodiments, the initiation of the update to the at least one of the one or more applications may include reassigning the at least one of the generated tasks. In some embodiments, the initiation of the update to the at least one of the one or more applications may include providing a recommendation to reassign the at least one of the generated tasks.

In some embodiments, the method can further include: initiating, by the computing device, another call to the APIs of the remote computing devices to retrieve other data about tasks from the one or more applications that have been completed; and analyzing, by the computing device, the retrieved other data to identify at least one of the completed tasks as being similar to the at least one of the generated tasks, wherein the initiation of the update to the at least one of the one or more applications is based on the data retrieved for the at least of the completed tasks. In some embodiments, the analyzing of the retrieved other data to identify the at least one of the completed tasks as being similar to the at least one of the generated tasks includes using a cosine similarity algorithm.

According to one aspect of the disclosure, an apparatus can include a processor and a non-volatile memory storing computer program code that when executed on the processor causes the processor to execute a process corresponding to the aforementioned method or any described embodiment thereof.

According to one aspect of the disclosure, a non-transitory machine-readable medium may encode instructions that when executed by one or more processors cause a process to be carried out, the process corresponding to the aforementioned method or any described embodiment thereof.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the following claims.

BRIEF DESCRIPTION OF THE DRAWINGS

The manner of making and using the disclosed subject matter may be appreciated by reference to the detailed description in connection with the drawings, in which like reference numerals identify like elements.

FIG. 9 is a flow diagram showing an illustrative process for completing tasks by a given time, according to some embodiments of the present disclosure.

The drawings are not necessarily to scale, or inclusive of all elements of a system, emphasis instead generally being placed upon illustrating the concepts, structures, and techniques sought to be protected herein.

DETAILED DESCRIPTION

Figure 1:
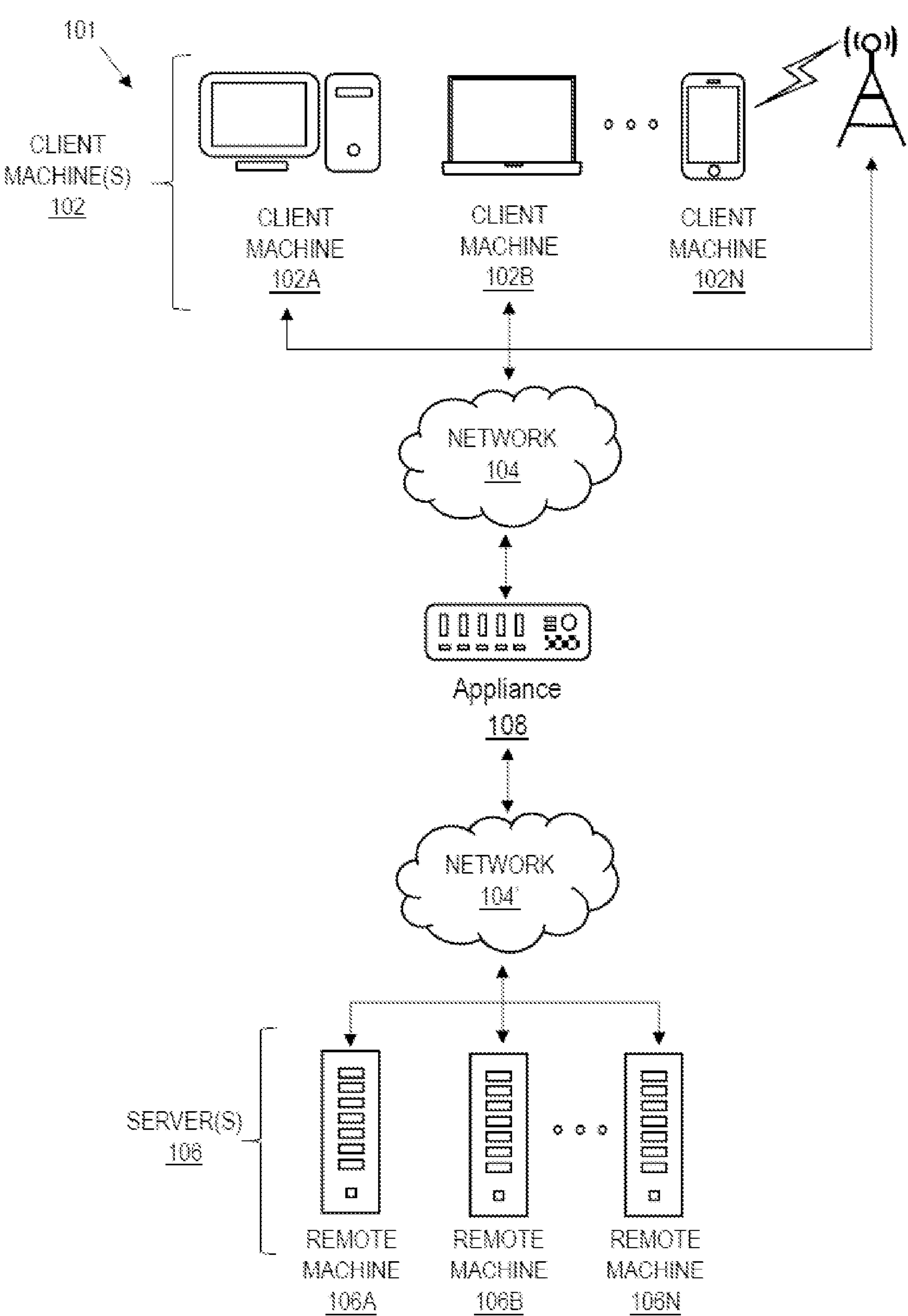
FIG. 1 is a diagram illustrating an example network environment of computing devices in which various aspects of the disclosure may be implemented, in accordance with an embodiment of the present disclosure.

Referring now to FIG. 1, shown is an example network environment 101 of computing devices in which various aspects of the disclosure may be implemented, in accordance with an embodiment of the present disclosure. As shown, environment 101 includes one or more client machines 102A-102N, one or more remote machines 106A-106N, one or more networks 104, 104', and one or more appliances 108 installed within environment 101. Client machines 102A-102N communicate with remote machines 106A-106N via networks 104, 104'.

In some embodiments, client machines 102A-102N communicate with remote machines 106A-106N via an intermediary appliance 108. The illustrated appliance 108 is positioned between networks 104, 104' and may also be referred to as a network interface or gateway. In some embodiments, appliance 108 may operate as an application delivery controller (ADC) to provide clients with access to business applications and other data deployed in a datacenter, a cloud computing environment, or delivered as Software as a Service (SaaS) across a range of client devices, and/or provide other functionality such as load balancing, etc. In some embodiments, multiple appliances 108 may be used, and appliance(s) 108 may be deployed as part of network 104 and/or 104'.

Client machines 102A-102N may be generally referred to as client machines 102, local machines 102, clients 102, client nodes 102, client computers 102, client devices 102, computing devices 102, endpoints 102, or endpoint nodes 102. Remote machines 106A-106N may be generally referred to as servers 106 or a server farm 106. In some embodiments, a client device 102 may have the capacity to function as both a client node seeking access to resources provided by server 106 and as a server 106 providing access to hosted resources for other client devices 102A-102N. Networks 104, 104' may be generally referred to as a network 104. Networks 104 may be configured in any combination of wired and wireless networks.

Server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

Server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, server 106 may execute a remote presentation services program or other program that uses a thin-client or a remote-display protocol to capture display output generated by an application executing on server 106 and transmit the application display output to client device 102.

In yet other embodiments, server 106 may execute a virtual machine providing, to a user of client device 102, access to a computing environment. Client device 102 may be a virtual machine. The virtual machine may be managed by, for example, a hypervisor, a virtual machine manager (VMM), or any other hardware virtualization technique within server 106.

In some embodiments, network 104 may be: a local-area network (LAN); a metropolitan area network (MAN); a wide area network (WAN); a primary public network; and a primary private network. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
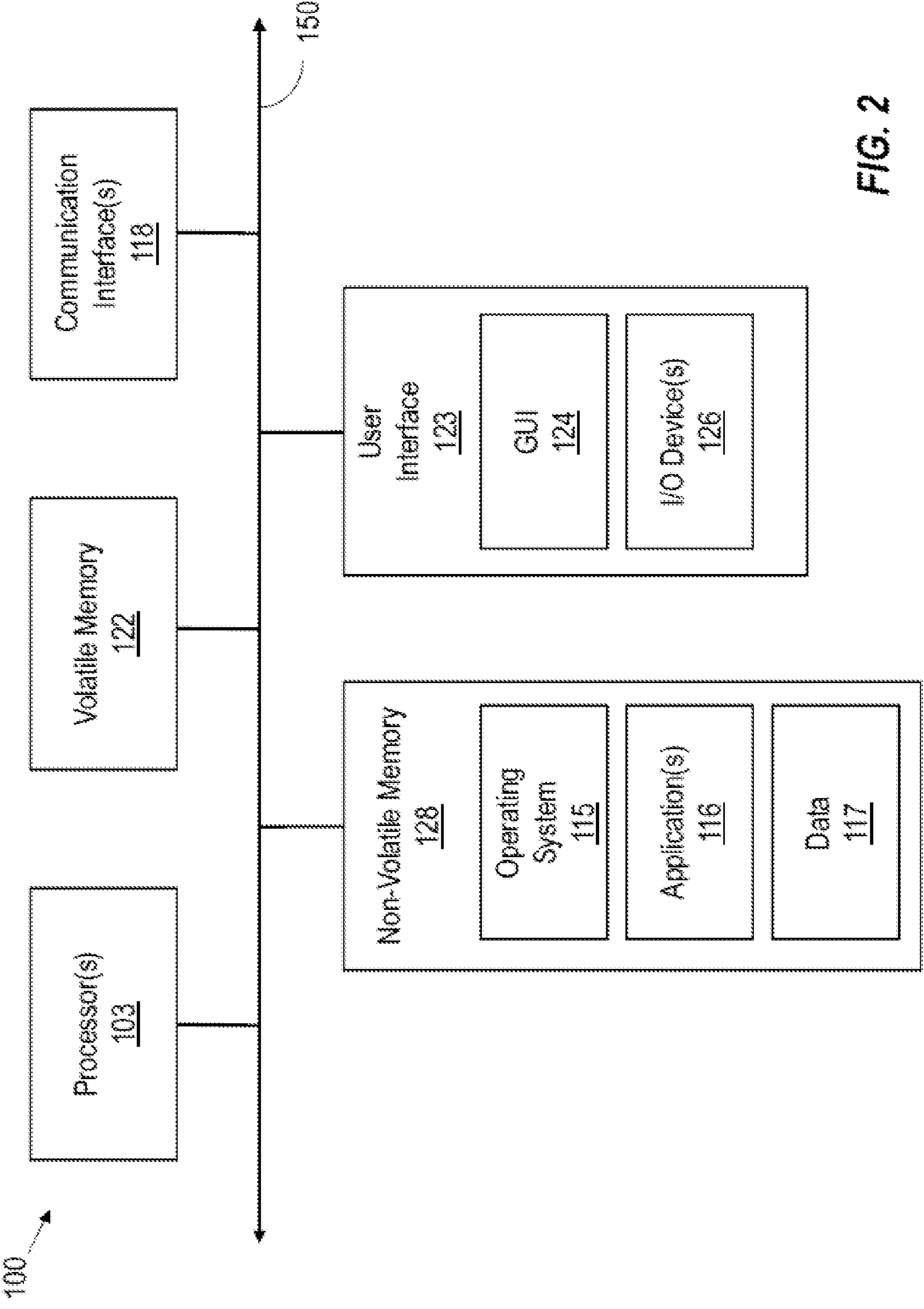
FIG. 2 is a block diagram illustrating selective components of an example computing device in which various aspects of the disclosure may be implemented, in accordance with an embodiment of the present disclosure.

FIG. 2 is a block diagram illustrating selective components of an example computing device 100 in which various aspects of the disclosure may be implemented, in accordance with an embodiment of the present disclosure. For instance, client devices 102, appliances 108, and/or servers 106 of FIG. 1 can be substantially similar to computing device 100. As shown, computing device 100 includes one or more processors 103, a volatile memory 122 (e.g., random access memory (RAM)), a non-volatile memory 128, a user interface (UI) 123, one or more communications interfaces 118, and a communications bus 150.

Non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

Non-volatile memory 128 stores an operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computing device 100 may communicate via communications bus 150.

The illustrated computing device 100 is shown merely as an example client device or server and may be implemented by any computing or processing environment with any type of machine or set of machines that may have suitable hardware and/or software capable of operating as described herein.

Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 103 may be analog, digital or mixed-signal. In some embodiments, processor 103 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 118 may include one or more interfaces to enable computing device 100 to access a computer network such as a Local Area Network (LAN), a Wide Area Network (WAN), a Personal Area Network (PAN), or the Internet through a variety of wired and/or wireless connections, including cellular connections.

In described embodiments, computing device 100 may execute an application on behalf of a user of a client device. For example, computing device 100 may execute one or more virtual machines managed by a hypervisor. Each virtual machine may provide an execution session within which applications execute on behalf of a user or a client device, such as a hosted desktop session. Computing device 100 may also execute a terminal services session to provide a hosted desktop environment. Computing device 100 may provide access to a remote computing environment including one or more applications, one or more desktop applications, and one or more desktop sessions in which one or more applications may execute.

Figure 3:
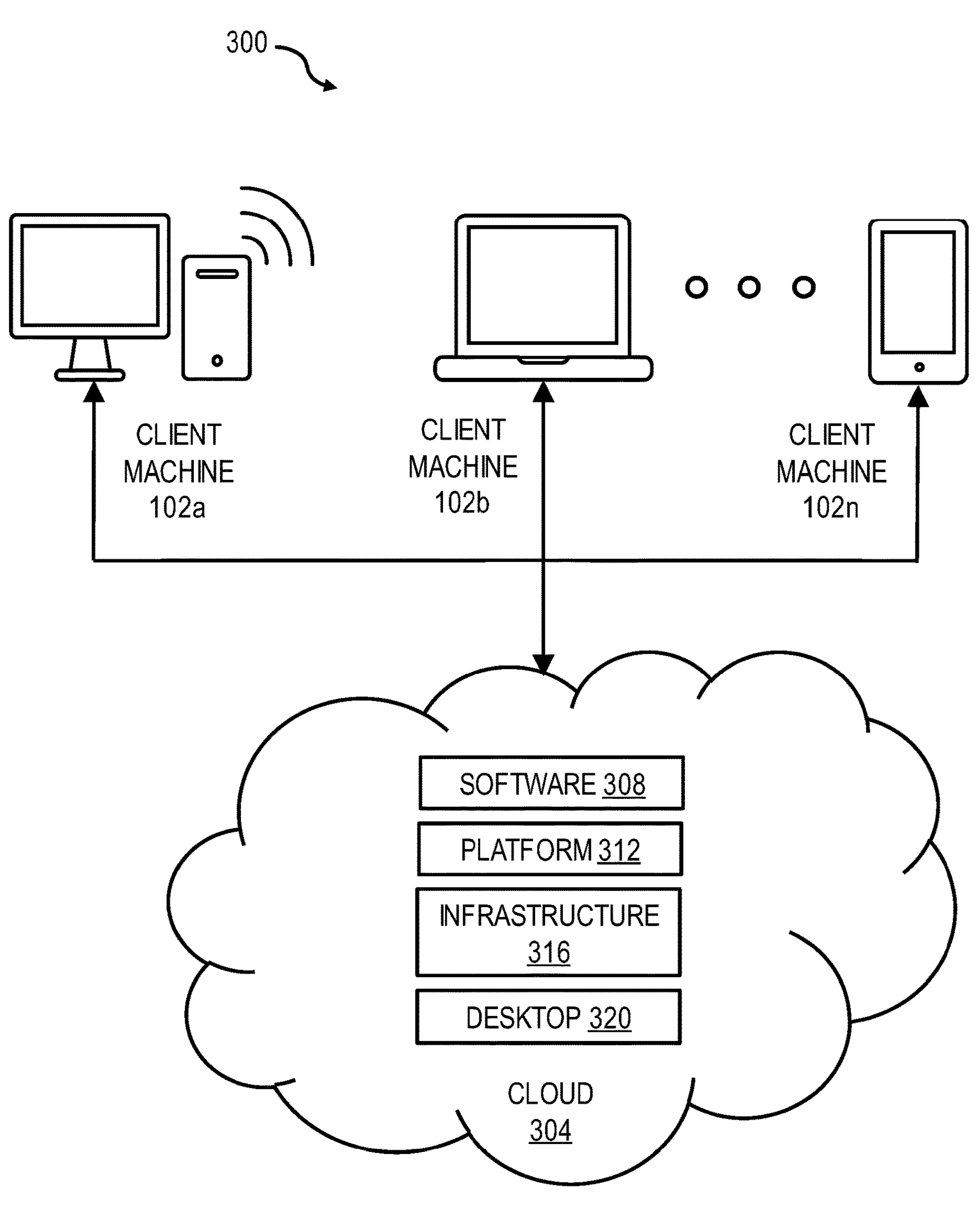
FIG. 3 is a diagram of a cloud computing environment in which various aspects of the concepts described herein may be implemented.

Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 102*a*-102*n* (such as those described above) are in communication with a cloud network 304. The cloud network 304 may include back-end platforms, e.g., servers, storage, server farms or data centers. The users or clients 102*a*-102*n* can correspond to a single organization/tenant or multiple organizations/tenants. More particularly, in one example implementation the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 102*a*-102*n* or the enterprise/tenant. The servers may be located off-site in remote geographical locations or otherwise.

The cloud computing environment 300 can provide resource pooling to serve multiple users via clients 102*a*-102*n* through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 102*a*-102*n*. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 102. In some embodiments, the cloud computing environment 300 can include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 308, Platform as a Service (PaaS) 312, Infrastructure as a Service (IaaS) 316, and Desktop as a Service (DaaS)

320, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. Citrix ShareFile from Citrix Systems, DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4A:
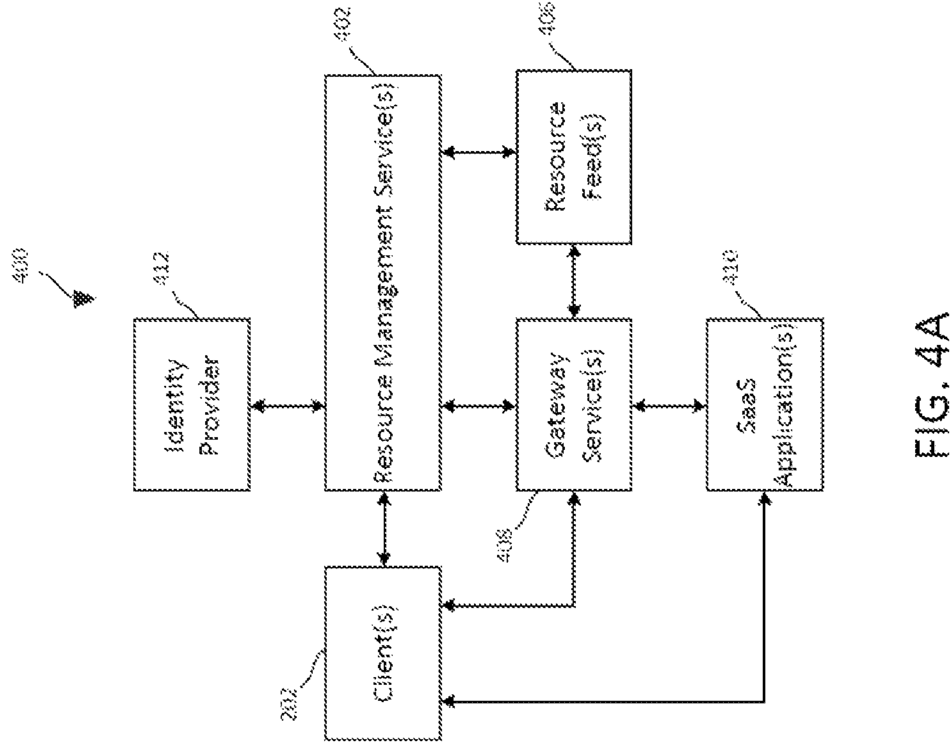
FIG. 4A is a block diagram of an example system in which resource management services may manage and streamline access by clients to resource feeds (via one or more gateway services) and/or software-as-a-service (SaaS) applications.

FIG. 4A is a block diagram of an example system 400 in which one or more resource management services 402 may manage and streamline access by one or more clients 202 to one or more resource feeds 406 (via one or more gateway services 408) and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
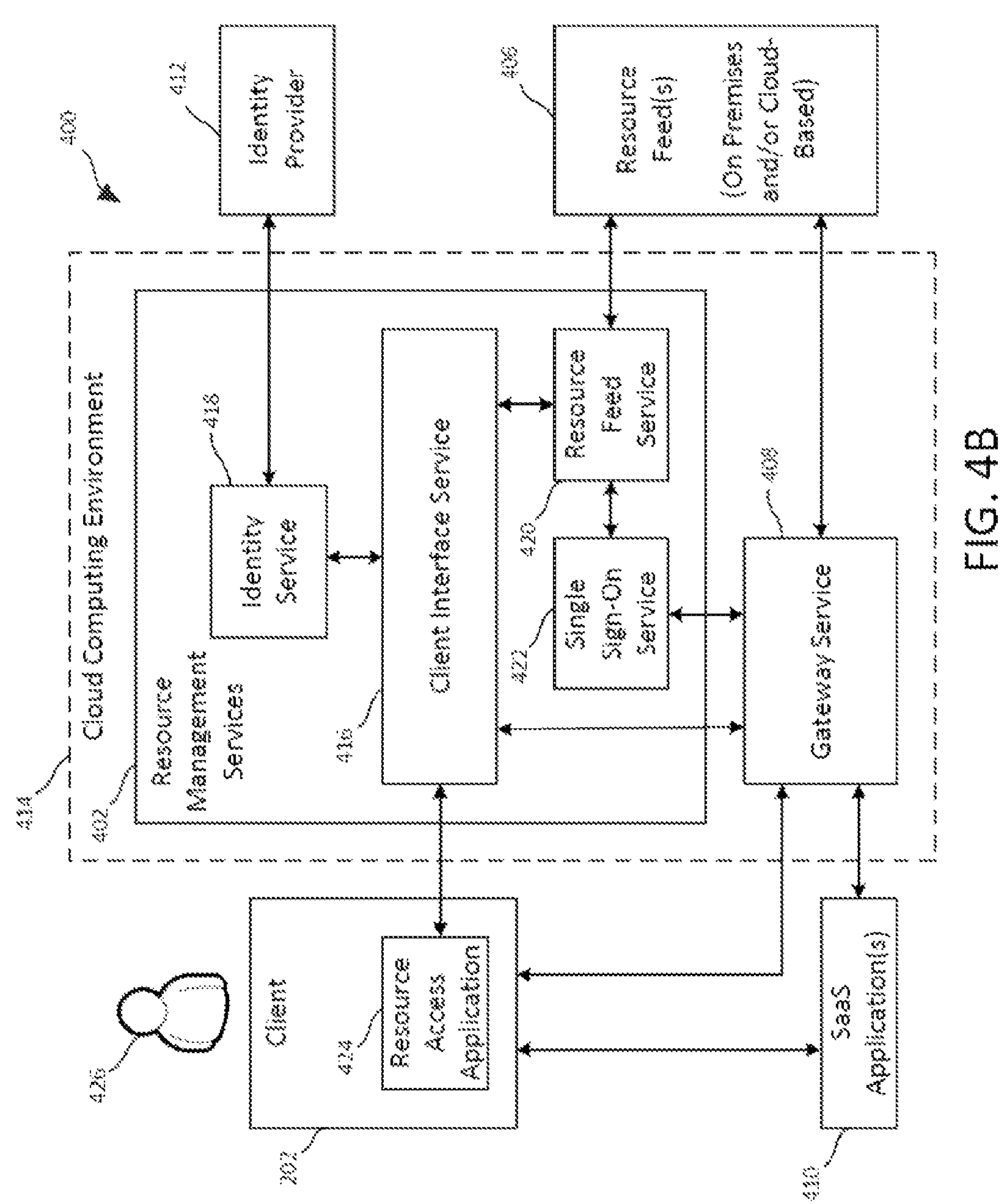
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
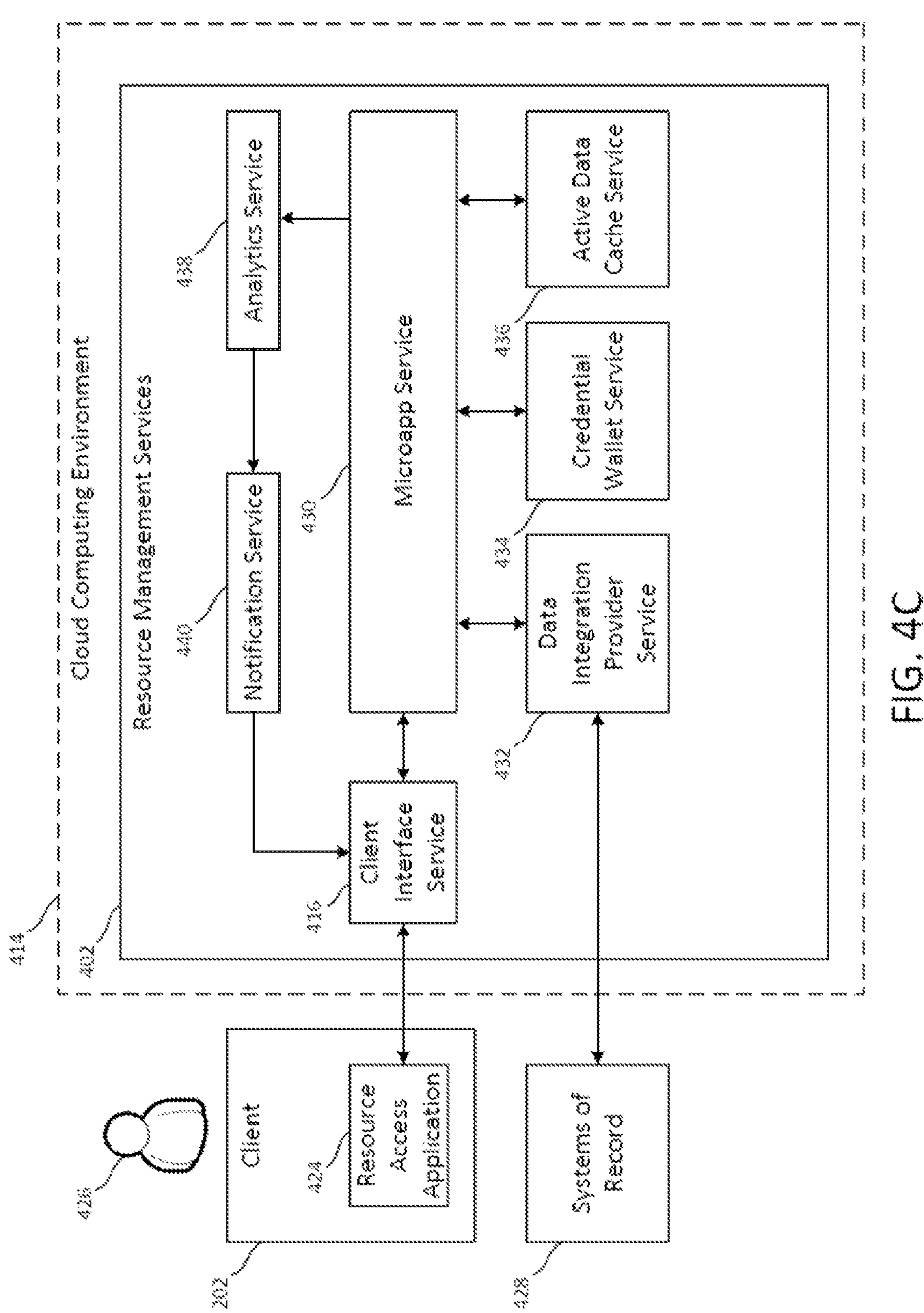
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapps service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in a notification feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in a notification feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 432 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistance through either the resource access application 424 or directly from another resource, such as Microsoft Teams. This feature may allow employees to work efficiently, stay organized, and deliver only the specific information being sought.

Figure 5:
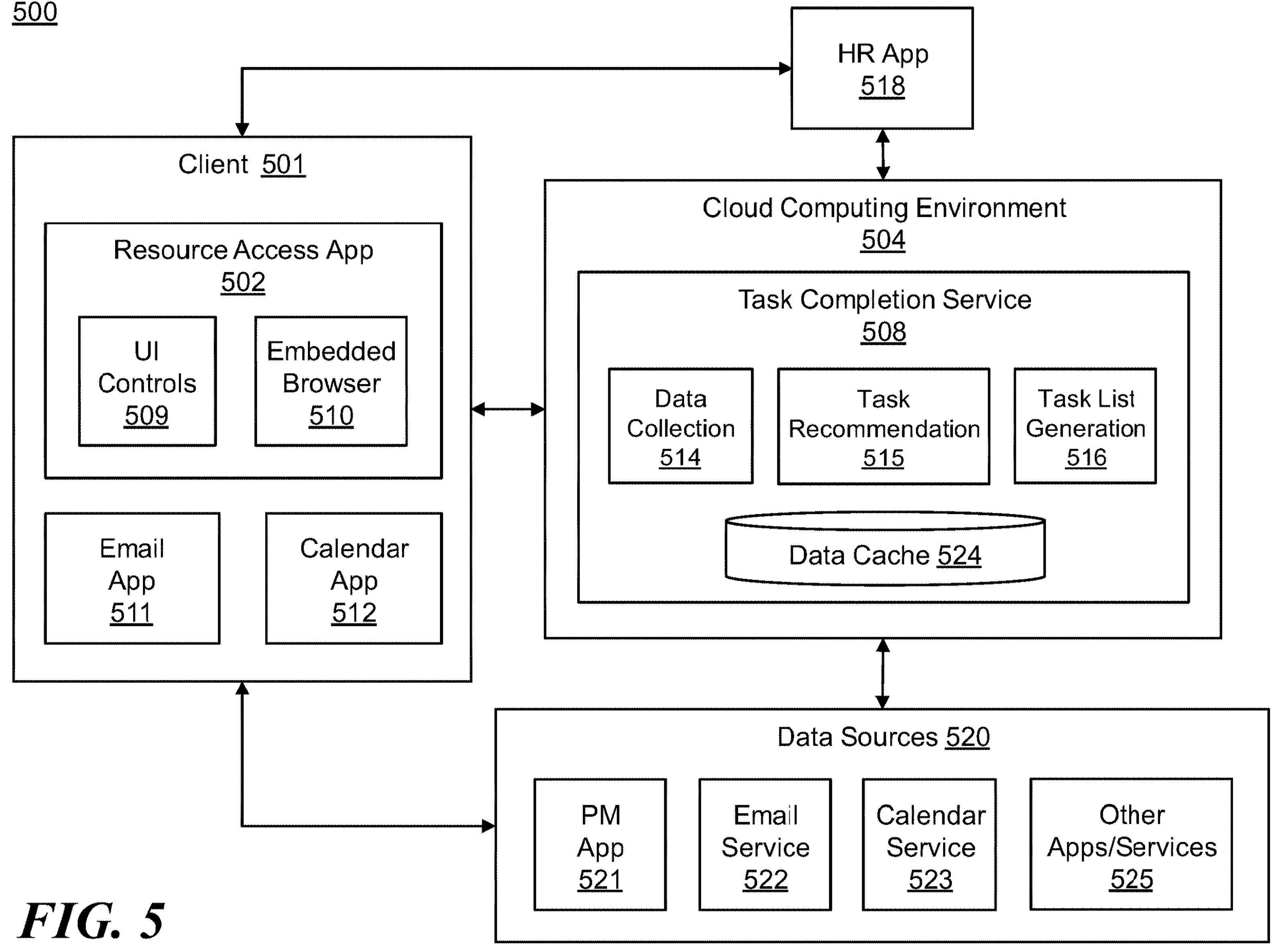
FIG. 5 is a block diagram of a system for completing tasks by a given time, according to some embodiments of the present disclosure.

FIG. 5 shows a system for completing tasks by a given time, according to some embodiments. Illustrative system 500 includes a resource access application 502 installed on a client 501 and configured to communicate with a cloud computing environment 504 via one or more computer networks. Client 501, resource access application 502, and cloud computing environment 504 may be the same as or similar to client 202, resource access application 424, and cloud computing environment 414, respectively, of FIGS. 4A-4C.

A task completion service 508 can be provided as a service (e.g., a microservice) within the cloud computing environment 504. Resource access application 502 and task completion service 508 can interoperate to automatically identify tasks of one or more applications that potentially may not be completed on time (e.g., by their due dates), to provide a list of such tasks to client 501, and to initiate updates to one or more of the applications so that the tasks are completed by the given time. To promote clarity in the drawings, FIG. 5 shows a single resource access application 502 connected to task completion service 508. However, embodiments of task completion service 508 can be used to service many resource access applications installed on clients associated with one or more organizations.

Resource access application 502 and/or task completion service 508 may be implemented as computer instructions executable to perform the corresponding functions disclosed herein. Resource access application 502 and task completion service 508 can be logically and/or physically organized into one or more components. In the example of FIG. 5, resource access application 502 includes UI controls 509 and an embedded browser 510. Also, in this example, task completion service 508 includes a data collection module 514, a task recommendation module 515, and a task list generation module 516.

Resource access application 502 and task completion service 508 can communicate using an API. In some embodiments, resource access application 502 can send a request to task completion service 508 to retrieve information for various resources accessible within resource access application 502. For example, resource access application 502 can send requests to task completion service 508 to check for updates to an activity feed presented by resource access application 502. The activity feed can include various types of notifications including notifications of task lists automatically generated by task completion service 508. In some embodiments, task completion service 508 can push information to resource access application 502.

Referring to the client-side resource access application 502, UI controls 509 can include various UI controls for accessing applications resources such as applications, microapps, desktops, etc. UI controls 509 can also include controls for viewing notifications and accessing a list of tasks generated by task completion service 508. Examples of UI controls 509 that can be implemented within resource access application 502 are described below in the context of FIG. 6. Embedded browser 510 can provide access to various web applications and SaaS applications, such as human resources (HR) application 518 for managing requests for time off (e.g., PTO request) and a project management (PM) application 521 for managing lists of tasks. FIG. 7 shows an illustrative UI that can be implemented within PM application 521 and displayed by embedded browser 510.

HR application 518 may provide various functionality related to human resource management functions—sometimes referred to as human capital management (HCM)—including but not limited to the management of time off requests submitted by one or more users of one or more organizations. HR application 518 may provide one or more interfaces (e.g., a UI or an API accessible by resource access application 502) usable by clients 501 for submitting time off requests. A time off request can include a start date/time and an end date/time or, similarly, a start date/time and a duration. HR application 518 may also provide one or more interfaces for reviewing, approving, and denying submitted time off requests. These interfaces may be used by authorized clients (e.g., clients associated with a supervisor) to approve/deny time off requests. The period of time specified by an approved time off request is referred to herein as the time off period. HR application 518 may be a SaaS application that can service multiple organizations (e.g., companies) each having multiple users (e.g., employees). HR application 518 may provide one or more API calls via which other applications and services can invoke to retrieve data including information about approved time off requests for a particular user or group of users (e.g., all users within a given organization). In some embodiments, HR application 518 may correspond to WORKDAY.

PM application 521 may provide various functionality related to project management including but not limited to the creation, viewing, and updating of lists of tasks. A given task list may include tasks of the PM application 521 itself and/or tasks of one or more other applications. An example of a task list that can be presented by PM application 521 is described below in the context of FIG. 7. PM application 521 may be a SaaS application that can service multiple organizations each having multiple users. PM application 521 may provide an API via which other applications and services can, for example, create new task lists and update existing task lists. PM application 521 may also provide a UI for viewing task lists, such as the UI shown in FIG. 7. In some embodiments, PM application 521 may correspond to WRIKE, JIRA, BASECAMP, or TRELLO.

In addition to resource access application 502, various other applications can be installed on client 501, such as an email application 511 and a calendar application 512. The email application 511 and calendar application 512 can communicate with an email service 522 and a calendar service 523, respectively, via one or more computer networks. In some embodiments, email application 511 and calendar application 512 can correspond to a single application such as OUTLOOK that provides both calendaring and email functionality. In some embodiments, email service 522 and calendar service 523 an may correspond to a combined service that provides both calendaring and email, such as EXCHANGE.

Referring to cloud-side task completion service 508, data collection module 514 is operable to retrieve information from HR application 518 and one or more data sources 520. In more detail, data collection module 514 can query HR application 518 for approved time off requests for a particular user or group of users, e.g., multiple users within the same team, the same organization, etc. In some embodiments, data collection module 514 can query for approved time off requests that have a start date within a certain time period based off the current date/time, such as the next N days where N equals 5, 7, 14, 30, etc. This time period is referred to herein as the upcoming time off window and the corresponding approved time off requests are referred to as upcoming time off requests. The upcoming time off window may be defined as a configuration setting of task completion service 508 and, in some cases, may be configurable per user and/or per organization. For example, the upcoming time off window may be configured as an organizational policy or a user preference.

Data collection module 514 can analyze the upcoming time off requests to identify one or more users that are approved to take time off and, thus, potentially not be able to complete one or more of their tasks on time (e.g., tasks due during a time off period). Such users are referred to as candidate users. In some embodiments, data collection module 514 can exclude certain time off requests from this analysis. For example, data collection module 514 may exclude time off requests that have a duration that is less than a threshold duration, e.g., less than M days where M equals 2, 3, 4, 5, 6, 7, etc. The particular threshold duration used may be a configuration setting of task completion service 508 and, in some cases, may be configurable per user and/or per organization.

Having identified one or more candidate users, data collection module 514 can collect data about tasks assigned to or otherwise associated with the candidate users from one or more data sources 520. In more detail, data collection module 514 can initiate a call APIs of one or more remote computing devices to retrieve data about the one or more tasks from the one or more data sources 520 (e.g., applications, services, etc.) For a given task, data collection module 514 may collect a description of the task (e.g., a string) and optionally a due date of the task. Data collection module 514 can retrieve data for tasks that the candidate users are potentially unable to complete due to their upcoming time off. For a given candidate user, data collection module 514 may collect data for tasks for that user that are due during the user's approved time off period. In some embodiments, data collection module 514 may also collect data for tasks that are due prior to the time off period. For example, data collection module 514 may collect data for all tasks that are due prior to the time off period. As another example, data collection module 514 may collect data for tasks that are due a certain amount of time before the time off period, such as 1, 2, 3, 5, or 7 days before. In some embodiments, data collection module 514 may also collect data for tasks that are due a certain amount of time after the time off period, such as 1, 2, 3, 5, or 7 days after, as the user may also be potentially unable to complete such tasks on time. The number of days before and after the time off period may be configuration settings of task completion service 508 and may be set on a per-organization and/or per-user basis. For clarify of explanation, the total period for which data collection module 514 collects task data for a given user is referred to herein as the data collection period. The data collection period used when collecting task data for a given candidate user may depend on the user's approved time off period in addition to organizational policy and/or user preference.

In some embodiments, for a given candidate user, data collection module 514 may wait until the start of the user's data collection period to commence collection of that user's tasks. For example, data collection module 514 may determine the user has an approved time off request on a certain day, and they may wait one or more days to collect task data for the user depending on when corresponding data collection period is set to start. In some embodiments, data collection module 514 may wait a certain number of days (e.g., 1, 2, 3, 4, 5, 7, etc. days) before a user's time off period to being collecting the user's task data. In other embodiments, data collection module 514 may collect task data for a user in response to determining the user has an approved time off request and without waiting for the data collection period to start.

Data sources 520 can include various application and services that store task-related data and that provide APIs for retrieving said data. As shown in FIG. 5, data sources 520 may include the PM application 521, the email service 522, the calendar service 523, along with various other applications and services 525. When collecting task data, data collection module 514 may use different rules/techniques/logic for different ones of the data sources 520. In some embodiments, data collection module 514 may include a plurality of data source-specific (e.g., application-specific) submodules that include executable instructions for retrieving and analyzing task data for the different data sources 520.

For PM application 521, a task may correspond an assignable unit of work associated for a project. For example, a software development project may include various tasks or "tickets" corresponding to features to be developed and bugs that are to be fixed/investigated. Such a task may be assigned to a certain user to perform the work and reassigned to another user to review the work, and there may be separate due dates associated with the performance and the review of the work. Data collection module 514 may directly obtain a description and due date of a task using an API provided by the PM application 521.

For email service 522 as well other applications/services 525 that provide messaging capabilities, a task may correspond to an action item or deliverable that is specified by the subject or body of an email or, more generally, by the content of a message. For example, if a user receives a message that includes the text "Complete this survey by July 8," data collection module 514 can identify a task having the description "complete this survey" with a due date of Dec. 4, 2021. Various techniques can be used to identify tasks within messages. In some embodiments, data collection module 514 may use template/pattern matching to identify tasks from the contents of emails and other messages. For example, a template can have the form of: {task description}+whitespace+{due date}, where {task description} matches on a predefined set of keywords such as "finish," "complete," "submit," etc. In other embodiments, data collection module 514 may use natural language process (NPL) or another machine learning (ML) technique to identify tasks from within messages retrieved from data sources 520.

For calendar service 523, a task may correspond to a meeting, an appointment, a reminder, or other event scheduled on a user's calendar. Data collection module 514 may use the title or description of the calendar event as the task's description and may use a date/time of the calendar event as the task's due date.

In some cases, data collection module 514 can retrieve, for a given candidate user and a given data source, data about tasks of the user that are due to be completed during the relevant collection period, which period is discussed in detail above. This approach may be used where the data source's API provides the ability to search for tasks by, for example, assignee and due date. In other cases, for a given candidate user and a given data source, data collection module 514 can retrieve data about all tasks of a user (e.g., all tasks assigned to or otherwise associated with the user), or all incomplete tasks of the user, and then filter the returned data to exclude tasks already completed as well as tasks that are not due during the data collection period. This approach may be used, for example, when retrieving data from email service 522, where the data collection module 514 must first perform an analysis of returned email data (e.g., a textual analysis of email subjects and bodies) to identify tasks and corresponding due dates.

Data collection module 514 may utilize APIs provided by data sources 520 to query/retrieve information therefrom. For example, data collection module 514 may use MICROSOFT GRAPH APIs to access a user's email from email service 522 and a user's calendars from calendar service 523. As another example, data collection module 514 may use a REST-based API provided by various SaaS applications such as PM application 521 and other applications/services 525 to query/retrieve information therefrom. A particular data source can be hosted within a cloud computing environment (e.g., cloud computing environment 504 or a different cloud computing environment) or within an on-premises data center (e.g., an on-premises data center of an organization that utilizes task completion service 508).

The particular set of data sources 520 used by task completion service 508 can vary between different organizations and/or between different users of the same organization. In some embodiments, task completion service 508 can obtain a list of applications and services used by a particular organization and/or user. For example, task completion service 508 may obtain a list of subscribed resources (e.g., applications and services) for a particular user/organization via resource feed service 420 of FIG. 4B. Task completion service 508 may also obtain, for one or more users, authentication credentials (e.g., user ids and passwords, access tokens, etc.) needed to access one of more of the data sources 520. In some embodiments, task completion service 508 may use a single sign-on (SSO) service, such as service 422 of FIG. 4B, to access one or more of the data sources 520.

In some embodiments, task completion service 508 may store upcoming time off requests and corresponding task data in a data cache 524 that can correspond to, for example, a storage service within cloud computing environment 504. In response to retrieving one or more upcoming time off requests from HR application 518, data collection module 514 can compare the retrieved time off requests to time off requests stored in the data cache 524 to determine which, if any, of the retrieved time off requests are new. Data collection module 514 can then collect task data for the new time off requests from one or more of the data sources 520 and store the new time off requests along with the corresponding task data in data cache 524. In this way, data collection module 514 may reduce the amount of bandwidth used by task completion service 508. In other embodiments, data collection module 514 can collect task data for all upcoming time off requests retrieved from HR application 518, regardless of whether the time off requests were previously retrieved by data collection module 514. In such embodiments, data cache 524 can be omitted.

In some cases, a task retrieved/identified by data collection module 514 may not have an explicit due date. For example, tasks that relate to the review of work performed by another user, such as "pull requests" in the case of a software development project, may not have a specific due date within PM application 521. As another example, an email retrieved from email service 522 may describe an action item to be performed by the recipient user but may not specify any due date for the action item. In such cases, data collection module 514 may assign a default due date to a task for the purpose of determining whether the task should be collected for a particular user (i.e., whether the task is "due" with the data collection period of the user). For example, task completion service 508 may assign a due date that is X days from the date the task was created or, in the case of email, X days from when the email was sent or received. X may be equal to 1, 2, 3, 5, 10, 15, 30, etc. and, in some cases may be a configuration setting. In some embodiments, default due date may vary depending on the data source or based on contextual information about the task. For example, a task retrieved from PM application 521 may be assigned a certain default due date whereas a task identified based on data retrieved from email service 522 may be assigned a different default due date.

In some embodiments, data collection module 514 can collect information about upcoming time off requests from HR application 518 and corresponding task data form data sources 520 on a continuous or periodic basis. For example, data collection module 514 can query for approved time off requests that have a start date within a defined upcoming time off window (e.g., the next N days) and may perform this query on a periodic basis (e.g., hourly, daily, weekly, etc.). The collection period may be configurable by the organization and/or the user. In other embodiments, data collection module 514 can retrieve upcoming time off requests from HR application 518 in response to an input. For example, resource access application 502 may provide a button or other UI control which, when selected, causes resource access application 502 to send a message to task completion service 508 that causes data collection module 514 to query for upcoming time off requests and corresponding task data.

Task recommendation module 515 is configured to receive data for one or more tasks collected by data collection module 514 including tasks that potentially may not be completed on time (e.g., by their due dates). For a given task assigned to or associated with a given user, task recommendation module 515 can identify (or "recommend" or "suggest") one or more other users to whom the task may be reassigned so the task can be completed on time. Task recommendation module 515 may receive data from data sources 520 for one or more other tasks and analyze the data to identify another user that has completed or is otherwise associated with tasks similar to the given task and thus, may be a good candidate to reassign the given task to (e.g., can likely complete the task on time). In some cases, task recommendation module 515 may only consider other tasks that have been recently completed (e.g., completed within the past 1, 2, 3, 6, 9, or 12 months). In some embodiments, task recommendation module 515 can retrieve the other task data directly from data sources 520 using any of the techniques previously described. For example, task recommendation module 515 can a call APIs of one or more remote computing devices to retrieve data about the other, completed tasks from the one or more data sources 520 (e.g., applications, services, etc.). In other embodiments, data collection module 514 may collect such other data and provide it to task recommendation module 515 either directly or indirectly via the data cache 524.

In some embodiments, task recommendation module 515 can use natural language processing (NLP) techniques to determine a similarity between a given task and one or more other tasks. In more detail, for the given task and ones of the other tasks, task recommendation module 515 can obtain a trained word vector (e.g., 300-dimension word vectors) corresponding to a word extracted from the task's title, description, or other data collected for the task. A word vector is a vector of numbers that represent the meaning of a word. The numbers in the word vector represent the word's distributed weight across dimensions. Each dimension can represent a certain meaning, and the word's numerical weight on that dimension captures the closeness of its association with and to that meaning. Thus, the semantics of the word are embedded across the dimensions of the vector. Task recommendation module 515 can retrieve pre-trained word vectors from third parties (e.g., open source word vectors) or can generate its own trained word vectors, e.g., using the word2vec algorithm.

If the title, description, or other data collected for a task (i.e., the given task or one of the other tasks) includes multiple words, task recommendation module 515 may generate a vector for the task that is based on an average of those words. In more detail, task recommendation module 515 may receive a string corresponding to the task's title, description, or other data. Next, task recommendation module 515 may split the string into a list of words while excluding "stop words" from the list. Examples of stop words in English are "a", "the", "is", "are" and etc. Stop words are commonly used in Text Mining and Natural Language Processing (NLP) to eliminate words that are so commonly used that they carry relatively little useful information. In some embodiments, a list of stop words may be hardcoded within task recommendation module 515 or provided within configuration file or database accessed by task recommendation module 515. Next, task recommendation module 515 may generate a vector for each word in the list using, for example, the word2vec algorithm. Next, task recommendation module 515 may generate the vector for the task by averaging the multiple word vectors.

Having obtained trained word vectors for the given task and for one or more other tasks, task recommendation module 515 can use a similarity algorithm to calculate a similarity score between the given task and ones of the other tasks. In some embodiments, a cosine similarity algorithm may be used to calculate a similarity score, such as the following algorithm in which A corresponds to a first word vector (e.g., the word vector obtained for the given task) and B corresponds to a second word vector (e.g., the word vector obtained for one of the other tasks). In the case where the given task and/or the one of the other tasks includes multiple words, A and/or B may correspond to a vector based on an average of those words, as previously discussed.

$$\cos\theta = \frac{\sum_{i=1}^{n}(A_i \times B_i)}{\sqrt{\sum_{i=1}^{n}(A_i)^2} \times \sqrt{\sum_{i=1}^{n}(B_i)^2}} = \frac{A \cdot B}{|A| \times |A|}$$

Various other techniques can be used to compute a similarity between data collected for two tasks.

Having computed similarity scores between the given task and the other tasks, task recommendation module 515 can then group the other tasks by user (e.g., by the users whom completed those tasks) and calculate an average similarity score within each group. In some embodiments, similarity scores that less than a given threshold score (e.g., less than 0.5 where the range of similarity scores is between 0.0 and 1.0) may be excluded from the average. In some embodiments, task recommendation module 515 may take the top Y scores in each group for the average. After calculating the averages, task recommendation module 515 can recommend that the given task be reassigned to the user with the highest average similarity score. In some embodiments, such a recommendation may take the form of data that identifies both a task and a user to whom the task can be reassigned to.

As an example, assume task recommendation module 515 retrieves/collects data for tasks that were completed by three (3) other users: "P2," "P3," and "P4." It is further assumed that each user completed five (5) or more tasks. To recommend which of the three (3) users to reassign a given task to, task recommendation module 515 may calculate fifteen (15) or more similarity scores, exclude scores less than 0.5, and then group the remaining scores by user. For example, task recommendation module 515 may generate a data structure such as the following:

```
{
  "name":"P2",
  "similarity_score_list":[
    0.5,
    0.7,
    0.8,
    0.7,
    0.5
  ]
},
{
  "name":"P3",
  "similarity_score_list":[
    0.6,
    0.9,
    0.9,
    0.8,
    0.5
  ]
},
{
  "name":"P4",
  "similarity_score_list":[
    0.6,
    0.7,
    0.8,
    0.9,
    0.5
  ]
}
```

Next, task recommendation module 515 may calculate an average similarity score for each user/group, resulting in a data structure such as the following:

```
{
  "name":"P2",
  "average_score": 0.64
},
{
  "name":"P3",
  "average_score": 0.74
},
{
```

-continued

```
  "name":"P4",
  "average_score": 0.7
}
```

Task recommendation module 515 may recommend that the given task be reassigned to the user with the highest average similarity score; user P3 in this example.

In some embodiments, task recommendation module 515 may only recommend assigning tasks to other users that are part of the same organization or other users that belong to the same team, department, section, etc. within the organization. In some embodiments, task recommendation module 515 may obtain information about teams and users belonging thereto from one or more of the data sources 520. For example, task recommendation module 515 may obtain information about teams from a productivity application such as TEAMS or SLACK. Thus, in the example above, users P2, P3, and P4 may belong to the same team as the user that potentially may not be able to complete the given task.

In some embodiments, task recommendation module 515 may store data about recommended task reassignments within data cache 520 along with the corresponding tasks collected and stored by data collection module 514.

Task list generation module 516 can use the task data collected by data collection module 514 to generate one or more lists of tasks that potentially may not be completed on time because of, for example, approved time off requests. In more detail, for a given candidate user, task list generation module 516 may receive tasks collected for the user directly from data collection module 514 or indirectly from data cache 524. Task list generation module 516 may then initiate an API call to an application (e.g., PM application 521 or another application that provides for the creation and access of lists) to create a list that includes information about the user's tasks. In some embodiments, tasks may be organized into different groups within the task list, as discussed further below in the context of FIG. 7. Task list generation module 516 may also specify a title for the task list, e.g., using the API of PM application 521. For example, if the candidate user is taking PTO from July 7$^{th}$ to July 9$^{th}$, task list generation module 516 may title the task list "Tasks Impacted by PTO (7/7-7/9)." In some embodiments, task list generation module 516 can also include recommendation data generated by task recommendation module 515 in the task list such that the recommendations are available within the PM application 521, as illustrated in FIG. 7. Task list generation module 516 may obtain the recommendation data directly from task recommendation module 515 or indirectly from the data cache 524.

After creating a task list in PM application 521 or another application, task list generation module 516 can send a link (or other information) to access the list within the application to resource access application 502. In some embodiments, task list generation module 516 may send a notification to resource access application 502, where the notification includes the title of the list and a link to access the list within PM application 521 or other application. In some embodiments, task list generation module 516 may send the notification to a microapp which in turn causes the notification to appear within resource access application 502.

In some embodiments, task list generation module 516 can analyze multiple tasks of a user to identify and remove duplicate tasks from a generated task list. Data about the same task may be collected from different data sources (e.g., from both the PM application 521 and from email service 522) and remove duplicate tasks may improve the usefulness of task lists generated according to the present disclosure. Various analysis techniques can be used to identify duplicate tasks, including but not limited to the use of an algorithm that computes a similarity scores, such as the algorithm discussed above in the context of task recommendation module 515.

In some embodiments, task completion service 508 and/or resource access application 502 can use recommendation data generated by task recommendation module 515 to automatically cause an update to at least one of the data sources 520 (e.g., to at least one application) so that at least one task is completed on time (e.g., by automatically reassigning the task to another user). In more detail, task completion service 508 may initiate a call to an API provided by at least one of the one or more data sources 520 to cause the task to be reassigned to the recommended user. This may be done in addition to or as an alternative to including such recommendations in the generated task list.

In some embodiments, some or all of the processing described for task completion service 508 can be implemented within resource access application 502. For example, some or all of the functionality of data collection module 514, task recommendation module 515, and/or task list generation module 516 may be implemented within resource access application 502 and configured to execute on client 501 rather than within cloud computing environment 504.

Figure 6:
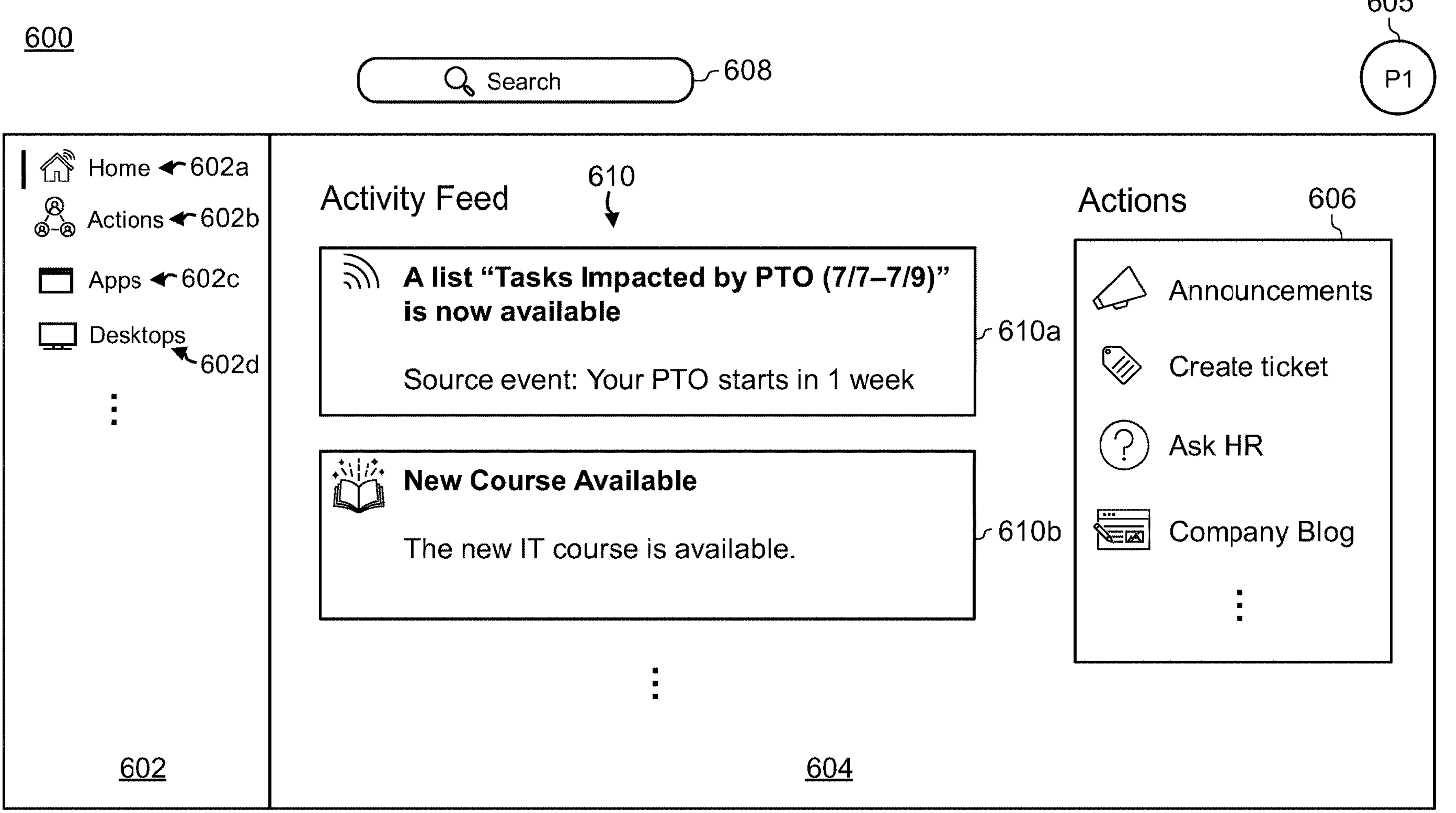
FIG. 6 is a diagram of an illustrative user interface (UI) for accessing a list of tasks to be completed by a given time, according to some embodiments of the present disclosure.
Figure 7:
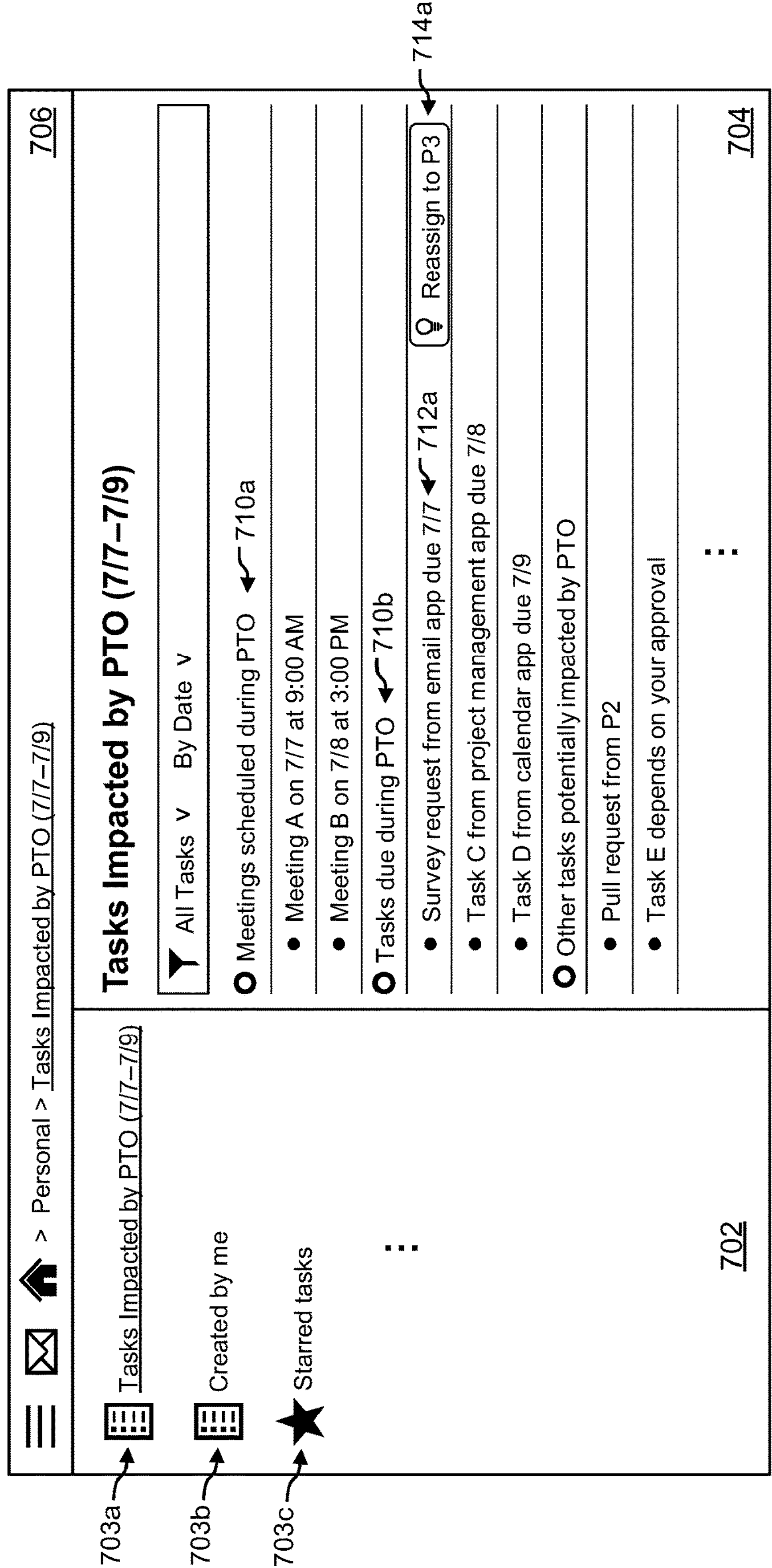
FIG. 7 is a diagram of an illustrative user interface (UI) for presenting a list of tasks to be completed by a given time along with controls for completing the tasks, according to some embodiments of the present disclosure.

FIG. 6 shows an example of a UI 600 for accessing a list of tasks to be completed by a given time, according to some embodiments of the present disclosure. UI 600 may be implemented, for example, within the system 500 of FIG. 5 and, more particularly, within resource access application 502 of FIG. 5. The illustrative UI 600 includes a resource menu 602, a content view 604, a search box 608, an icon 605 to identify the user of the resource access application (e.g., the user currently authenticated with the resource access application). In the example of FIG. 6, it is assumed that user "P1" is using the resource access application.

In the example shown, resource menu 602 can include a home menu item 602*a*, an actions menu item 602*b*, and a desktops menu item 602*d*. Menu items 602*a*-602*d* may also be referred to as tabs. Menu item 602*a*-602*d* may be selectable for accessing corresponding functionality of the resources access application. As shown in FIG. 6, when the home menu item 602*a* is selected, content view 604 may display an activity feed 610 and actions 606. The activity feed 610 can display one or more notifications 610*a*, 610*b*, etc. received by the resource access application. In some embodiments, activity feed 610 may display notifications received by one or more microapps. Actions 606 can include links or other controls for accessing various applications and features thereof. For example, actions 606 can include a link to an HR application for requesting time off, such as HR application 518 of FIG. 5.

As shown, activity feed 610 can display a notification 610*a* that a new task list has been created based on an upcoming time off request. The task list may have been created within an application (e.g., PM application 521 of FIG. 5) by a cloud computing service (e.g., task completion service 508 of FIG. 5) that caused the notification 610*a* to be sent and displayed by UI 600. Notably, the creation and display of the task list within UI 600 may occur automatically in response to the time off request being submitted and without further input (e.g., without further user action). The notification 610*a* may be configured such that when it is selected (e.g., when it receives a click or a tap), the resource access application will access the task list with the application (e.g., within PM application 521 of FIG. 5). For example, in response to a selection of notification 610*a*, the application and task list may be loaded and displayed within a browser, such as embedded browser 510 of FIG. 5.

FIG. 7 shows an example of a UI 700 for presenting a list of tasks to be completed by a given time along with controls to assist with completion of the tasks, according to some embodiments of the present disclosure. UI 700 may be implemented, for example, within the system 500 of FIG. 5 and, more particularly, within PM application 521 of FIG. 5. The illustrative UI 700 includes a menu 702, a list view 704, and a navigation bar 706. Menu 702 can include controls for accessing one or more task lists 703*a*, 703*b*, 703*c*, etc. (703 generally). The menu 702 can include one or more lists created automatically in response to a time off request or approval thereof. For example, an illustrative task list 703*a* entitled "Tasks Impacted by PTO (7/7-7/9)" may be automatically generated within a PM application in response to a request for time off between July $7^{th}$ and July $9^{th}$. Techniques and structures for generating such a task list are described above in the context of FIG. 5.

In response to a selection of task list 703*a* within menu 702, list view 704 may be updated to show information about one or more tasks of the selected task list. For example, list view 704 can show tasks that have the potential to not be completed on time (e.g., by their explicit or default due dates) because of the upcoming time off. In some embodiments, the tasks may be organized into one or more groups displayed within list view 704. In the example of FIG. 7, the tasks of task list 703*a* are organized into a first group 710*a* corresponding to meetings scheduled to occur during the time off period (e.g., meetings organized by the user and/or meetings they are invited to), a second group 720*b* corresponding to tasks that have explicit due dates during the time off period, and a third group 720*c* of other tasks that are potentially impacted by the time off (e.g., tasks that do not have an explicit due date but that were assigned a default due date by task completion service 508).

List view 704 can also display recommendations to assist with the completion of one or more of the tasks. For example, list view 704 can include buttons, links, or other UI controls for reassigning particular tasks to certain other recommended users (e.g., other users that are likely capable of completing the task on time). Such recommendations may be generated, for example, by task recommendation module 515 of FIG. 5 and provided to UI 700. In the example of FIG. 7, list view includes a UI control 714*a* for reassigning a task 712*a* to another user P3. In response to a selection of UI control 714, UI 700 may initiate an update to an application in which task 712*a* was generated, such that the task may be completed on time.

Figure 8:
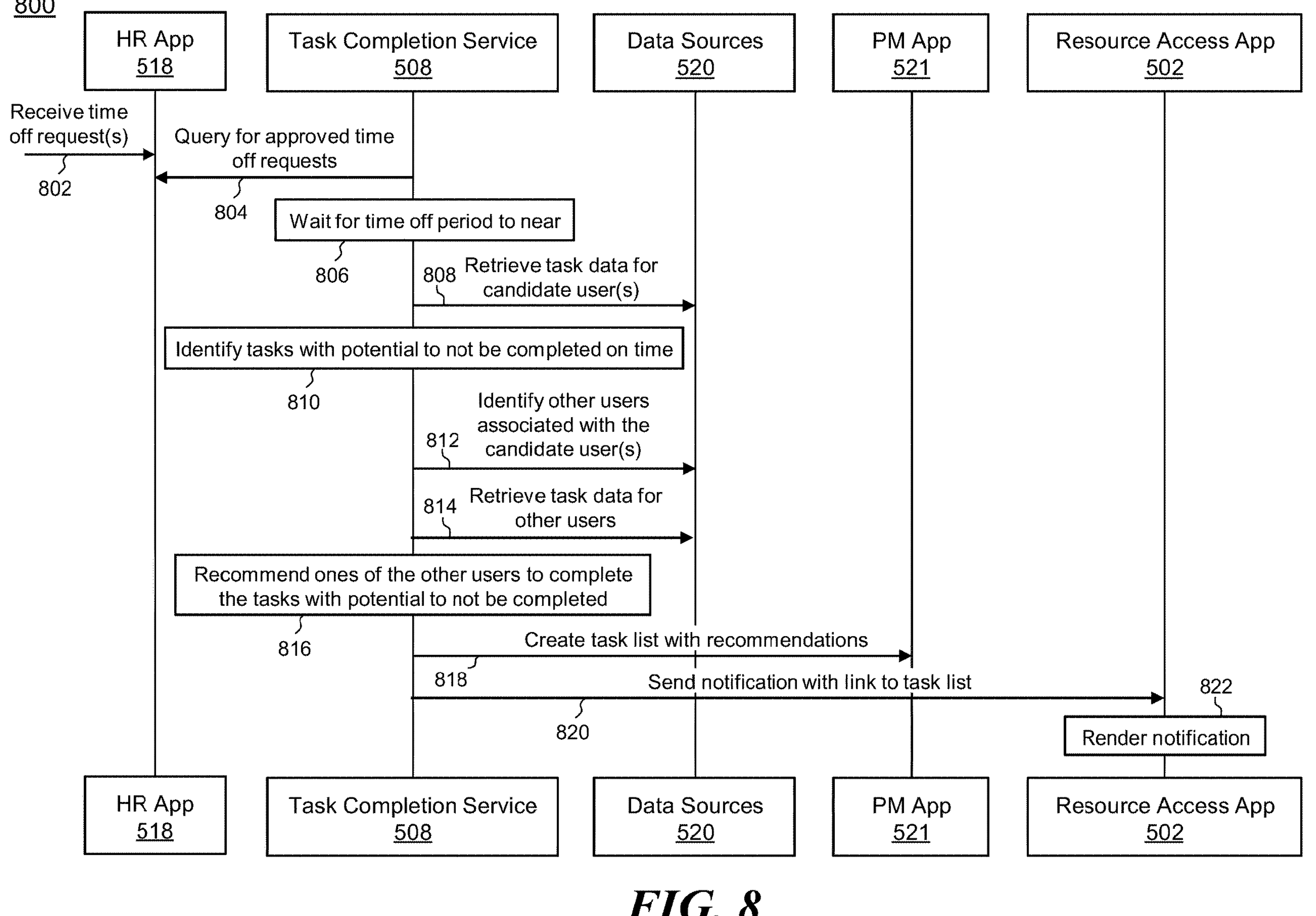
FIG. 8 is a diagram showing interactions that can occur within the system of FIG. 5, according to some embodiments of the present disclosure.

FIG. 8 is shows interactions that can occur between various components of the system of FIG. 5, according to some embodiments of the present disclosure. Like reference numerals in FIGS. 5 and 8 identify like elements.

At 802, HR application 518 may receive one or more time off requests. For example, HR application 802 may receive the time off requests from one or more clients via a UI or API provided by HR application 802. HR application 518 may also receive approvals for the time off requests. For example, HR application 518 may receive the approvals from one or more clients (e.g., clients associated with supervisory users) via a UI or API provided by HR application 518.

At 804, task completion service 508 can query HR application 518 for approved time off requests. Techniques for performing such query are described above in the context of FIG. 5. HR application 518 may return information about one or more approved time off requests, including information identifying the users that requested the time off and the corresponding time off periods. For clarity, this and other responses are not shown in FIG. 8.

In some embodiments, at 806, task completion service 508 may waiting for one or more of the time off periods to near before performing subsequent actions described herein. For example, task completion service 508 may wait until a certain number of days before (e.g., 2 days before) a time off period. If a particular time off requests begin in less than the certain number of days, then task completion service 508 may immediately perform one or more of the subsequent actions described herein.

At 808, task completion service 508 can retrieve task data for the users having approved time of request (i.e., the "candidate users") from data sources 520. At 810, task completion service 508 can analyze the returned task data to identify one or more tasks that potentially may not be completed on time (e.g., by their explicit or default due dates). Techniques for analyzing task data to identify such tasks are described above in the context of FIG. 5. As mentioned previously PM application 521 may, in some cases, also be used as a data source of task data.

At 812, task completion service 508 can identify other users associated with one or more of the candidate users based on data obtained from data sources 520. For example, task completion service 508 may obtain information about teams that a particular candidate user belongs, to including the identity of other users belonging to the same team. Such information may be retrieved by initiating a call to an API of one more of data sources 520, e.g., from a productivity application such as TEAMS or SLACK.

At 814, task completion service 508 can query data sources 520 for data about tasks completed by, assigned to, or otherwise associated with the identified other users. At 816, task completion service 508 can recommend ones of the other users that can complete the tasks that may otherwise not be completed on time (i.e., the tasks identified at 810). Techniques for recommending such other users are described above in the context of FIG. 5.

At 818, task completion service 508 initiate an API call with PM application 521 to create a task list there within. The task list can include descriptions of the tasks identified at 810 in addition with information about the recommendations generated at 816. For example, the task list can include, for one or more tasks, information identifying one of other users that can likely complete the task on time. In some embodiments, the task list may be presented within the PM application 521 using a UI that is similar to the UI of FIG. 7.

At 820, task completion service 508 can notify resource access application 502 that the task list has been created and, at 822, resource access application 503 test may render the notification. For example, resource access application 502 may render a notification that is similar to notification 610*a* of FIG. 6.

FIG. 9 shows an illustrative process 900 for completing tasks by a given time, according to some embodiments of the present disclosure. Process 900 may be performed in part or in whole by a cloud computing service, such as task completion service 508 of FIG. 5.

At block 902, a potential for tasks of one or more applications not to be completed at a given time may be completed. The one or more applications may be hosted on remote computing devices. In some embodiments, given time may correspond to a period of time (e.g., a period of time during which a user is approved to take time off). In some embodiments, block 902 can include receiving information about a time off request made via an application, such as HR application 518 of FIG. 5.

At block 904, a call to one or APIs of the remote computing devices may be initiated to retrieve data about the one or more tasks from the one or more applications. The tasks may include tasks generated by the one or more applications and may have a time of completion being that of the given time (e.g., having a due date within a given time period).

At block 906, an update may be initiated to at least one of the one or more applications using the retrieved data so that at least one of the generated tasks is completed before or at the given time. For example, an API call of the application may be imitated to reassign a task from one user to another. As another example, block 906 can include providing a list of tasks that potentially may not be completed by the given time, wherein the list includes recommendations of users to whom tasks may be reassigned for completing on time. In some embodiments, such a recommendation may be based on comparing data for a given task to data retrieved for multiple other tasks that have already been completed, such as using a technique described above in the context of FIG. 5.

The following examples pertain to further embodiments, from which numerous permutations and configurations will be apparent.

Example 1 includes a method including: determining, by a computing device, a potential for tasks of one or more applications not to be completed at a given time, the one or more applications being hosted on remote computing devices; initiating, by the computing device, a call to one or more application programmable interfaces (APIs) of the remote computing devices to retrieve data about the one or more tasks from the one or more applications, the tasks being generated by the one or more applications and including a time of completion being that of the given time; and initiating, by the computing device, an update to at least one of the one or more applications using the retrieved data, so that at least one of the generated tasks is completed before or at the given time.

Example 2 includes the subject matter of Example 1, wherein the given time includes a period of time, wherein the determination of the potential for tasks of the one or more applications not to be completed at the given time includes determining a potential for tasks of the one or more applications not to be completed within the period of time, wherein the time of completion of the generated tasks is within the period of time.

Example 3 includes the subject matter of Example 1 or 2, wherein the determination of the potential for the one or more tasks not to be completed at the given time includes receiving information about a time off request made by a user.

Example 4 includes the subject matter of any of Examples 1 to 3, wherein the initiation of the call to the one or more APIs includes querying the one or more applications for tasks to be completed at the given time.

Example 4 includes the subject matter of any of Examples 1 to 3, wherein the initiation of the update to the at least one of the one or more applications includes reassigning the at least one of the generated tasks.

Example 6 includes the subject matter of any of Examples 1 to 5, wherein the initiation of the update to the at least one of the one or more applications includes providing a recommendation to reassign the at least one of the generated tasks.

Example 7 includes the subject matter of any of Examples 1 to 6, and further includes: initiating, by the computing device, another call to the APIs of the remote computing devices to retrieve other data about tasks from the one or more applications that have been completed; and analyzing, by the computing device, the retrieved other data to identify at least one of the completed tasks as being similar to the at least one of the generated tasks, wherein the initiation of the update to the at least one of the one or more applications is based on the data retrieved for the at least of the completed tasks.

Example 8 includes the subject matter of Example 7, wherein the analyzing of the retrieved other data to identify the at least one of the completed tasks as being similar to the at least one of the generated tasks includes using a cosine similarity algorithm.

Example 9 includes an apparatus including: a processor and a non-volatile memory storing computer program code that when executed on the processor causes the processor to execute a process. The process includes: determining a potential for tasks of one or more applications not to be completed at a given time, the one or more applications being hosted on remote computing devices; initiating a call to one or more application programmable interfaces (APIs) of the remote computing devices to retrieve data about the one or more tasks from the one or more applications, the tasks being generated by the one or more applications and including a time of completion being that of the given time; and initiating an update to at least one of the one or more applications using the retrieved data, so that at least one of the generated tasks is completed before or at the given time.

Example 10 includes the subject matter of Example 9, wherein the given time includes a period of time, wherein the determination of the potential for tasks of the one or more applications not to be completed at the given time includes determining a potential for tasks of the one or more applications not to be completed within the period of time, wherein the time of completion of the generated tasks is within the period of time.

Example 11 includes the subject matter of Example 9 or 10, wherein the determination of the potential for the one or more tasks not to be completed at the given time includes receiving information about a time off request made by a user.

Example 12 includes the subject matter of any of Examples 9 to 11, wherein the initiation of the call to the one or more APIs includes querying the one or more applications for tasks to be completed at the given time.

Example 13 includes the subject matter of any of Examples 9 to 12, wherein the initiation of the update to the at least one of the one or more applications includes reassigning the at least one of the generated tasks.

Example 14 includes the subject matter of any of Examples 9 to 13, wherein the initiation of the update to the at least one of the one or more applications includes providing a recommendation to reassign the at least one of the generated tasks.

Example 15 includes the subject matter of any of Examples 9 to 14, and further includes: initiating another call to the APIs of the remote computing devices to retrieve other data about tasks from the one or more applications that have been completed; and analyzing the retrieved other data to identify at least one of the completed tasks as being similar to the at least one of the generated tasks, wherein the initiation of the update to the at least one of the one or more applications is based on the data retrieved for the at least of the completed tasks.

Example 16 includes the subject matter of Example 15, wherein the analyzing of the retrieved other data to identify the at least one of the completed tasks as being similar to the at least one of the generated tasks includes using a cosine similarity algorithm.

Example 17 includes a non-transitory machine-readable medium encoding instructions that when executed by one or more processors cause a process to be carried out. The process includes: determining a potential for tasks of one or more applications not to be completed at a given time, the one or more applications being hosted on remote computing devices; initiating a call to one or more application programmable interfaces (APIs) of the remote computing devices to retrieve data about the one or more tasks from the one or more applications, the tasks being generated by the one or more applications and including a time of completion being that of the given time; and initiating an update to at least one of the one or more applications using the retrieved data, so that at least one of the generated tasks is completed before or at the given time.

Example 18 includes the subject matter of Example 17, wherein the determination of the potential for the one or more tasks not to be completed at the given time includes receiving information about a time off request made by a user.

Example 19 includes the subject matter of Example 17 or 18, wherein the initiation of the update to the at least one of the one or more applications includes reassigning the at least one of the generated tasks.

Example 20 includes the subject matter of Example 17 to 19, wherein the initiation of the update to the at least one of the one or more applications includes providing a recommendation to reassign the at least one of the generated tasks.

The subject matter described herein can be implemented in digital electronic circuitry, or in computer software, firmware, or hardware, including the structural means disclosed herein and structural equivalents thereof, or in combinations of them. The subject matter described herein can be implemented as one or more computer program products, such as one or more computer programs tangibly embodied in an information carrier (e.g., in a machine-readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or another unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this disclosure, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of nonvolatile memory, including by ways of example semiconductor memory devices, such as EPROM, EEPROM, flash memory device, or magnetic disks. The processor and the memory can be supplemented by, or incorporated in, special purpose logic circuitry.

In the foregoing detailed description, various features are grouped together in one or more individual embodiments for the purpose of streamlining the disclosure. This method of disclosure is not to be interpreted as reflecting an intention that each claim requires more features than are expressly recited therein. Rather, inventive aspects may lie in less than all features of each disclosed embodiment.

References in the disclosure to "one embodiment," "an embodiment," "some embodiments," or variants of such phrases indicate that the embodiment(s) described can include a particular feature, structure, or characteristic, but every embodiment can include the particular feature, structure, or characteristic. Moreover, such phrases are not necessarily referring to the same embodiment(s). Further, when a particular feature, structure, or characteristic is described in connection knowledge of one skilled in the art to affect such feature, structure, or characteristic in connection with other embodiments whether or not explicitly described.

The disclosed subject matter is not limited in its application to the details of construction and to the arrangements of the components set forth in the following description or illustrated in the drawings. The disclosed subject matter is capable of other embodiments and of being practiced and carried out in various ways. As such, those skilled in the art will appreciate that the conception, upon which this disclosure is based, may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

All publications and references cited herein are expressly incorporated herein by reference in their entirety.

The invention claimed is:

1. A method comprising:

determining, by a computing device, a potential for tasks of one or more applications not to be completed at a given time, the one or more applications being hosted on remote computing devices;

initiating, by the computing device, a call to one or more application programmable interfaces (APIs) of the remote computing devices to retrieve data about the one or more tasks from the one or more applications, the tasks being generated by the one or more applications and including a time of completion being that of the given time;

initiating, by the computing device, another call to the APIs of the remote computing devices to retrieve other data about tasks that have been completed by other users from the one or more applications;

analyzing, by the computing device, the retrieved other data to identify at least one of the completed tasks as being similar to the at least one of the generated tasks, based on comparing task descriptions and completion times of the at least one of the completed tasks and the at least one of the generated tasks; and initiating, by the computing device, an update to at least one of the one or more applications using the retrieved data, so that at least one of the generated tasks is completed before or at the given time, wherein the initiation of the update to the at least one of the one or more applications is based on identifying another user who completed the at least one completed task similar to the at least one generated task, based on the comparison of the task descriptions and the completion times.

2. The method of claim 1, wherein the given time includes a period of time, wherein the determination of the potential for tasks of the one or more applications not to be completed at the given time includes determining a potential for tasks of the one or more applications not to be completed within the period of time, wherein the time of completion of the generated tasks is within the period of time.

3. The method of claim 1, wherein the determination of the potential for the one or more tasks not to be completed at the given time includes receiving information about a time off request made by a user.

4. The method of claim 1, wherein the initiation of the call to the one or more APIs includes querying the one or more applications for tasks to be completed at the given time.

5. The method of claim 1, wherein the initiation of the update to the at least one of the one or more applications includes reassigning the at least one of the generated tasks.

6. The method of claim 1, wherein the initiation of the update to the at least one of the one or more applications includes providing a recommendation to reassign the at least one of the generated tasks.

7. The method of claim 1, wherein the analyzing of the retrieved other data to identify the at least one of the completed tasks as being similar to the at least one of the generated tasks includes using a cosine similarity algorithm.

8. The method of claim 1, wherein, based on initiating the update, a notification is sent, using a microapp service that interfaces with the one or more APIs, that indicates the update and the at least one of the generated tasks.

9. An apparatus comprising:

a processor; and a non-volatile memory storing computer program code that when executed on the processor causes the processor to execute a process including:

determining a potential for tasks of one or more applications not to be completed at a given time, the one or more applications being hosted on remote computing devices;

initiating a call to one or more application programmable interfaces (APIs) of the remote computing devices to retrieve data about the one or more tasks from the one or more applications, the tasks being generated by the one or more applications and including a time of completion being that of the given time;

initiating another call to the APIs of the remote computing devices to retrieve other data about tasks that have been completed by other users from the one or more applications;

analyzing the retrieved other data to identify at least one of the completed tasks as being similar to the at least one of the generated tasks, based on comparing task descriptions and completion times of the at least one of the completed tasks and the at least one of the generated tasks; and initiating an update to at least one of the one or more applications using the retrieved data, so that at least one of the generated tasks is completed before or at the given time, wherein the initiation of the update to the at least one of the one or more applications is based on identifying another user who completed the at least one completed task similar to the at least one generated task, based on the comparison of the task descriptions and the completion times.

10. The apparatus of claim 9, wherein the given time includes a period of time, wherein the determination of the potential for tasks of the one or more applications not to be completed at the given time includes determining a potential for tasks of the one or more applications not to be completed within the period of time, wherein the time of completion of the generated tasks is within the period of time.

11. The apparatus of claim 9, wherein the determination of the potential for the one or more tasks not to be completed at the given time includes receiving information about a time off request made by a user.

12. The apparatus of claim 9, wherein the initiation of the call to the one or more APIs includes querying the one or more applications for tasks to be completed at the given time.

13. The apparatus of claim 9, wherein the initiation of the update to the at least one of the one or more applications includes reassigning the at least one of the generated tasks.

14. The apparatus of claim 9, wherein the initiation of the update to the at least one of the one or more applications includes providing a recommendation to reassign the at least one of the generated tasks.

15. The apparatus of claim 9, wherein the analyzing of the retrieved other data to identify the at least one of the completed tasks as being similar to the at least one of the generated tasks includes using a cosine similarity algorithm.

16. The apparatus of claim 9, wherein, based on initiating the update, a notification is sent, using a microapp service that interfaces with the one or more APIs, that indicates the update and the at least one of the generated tasks.

17. A non-transitory machine-readable medium encoding instructions that when executed by one or more processors cause a process to be carried out, the process including:

determining a potential for tasks of one or more applications not to be completed at a given time, the one or more applications being hosted on remote computing devices;

initiating a call to one or more application programmable interfaces (APIs) of the remote computing devices to retrieve data about the one or more tasks from the one or more applications, the tasks being generated by the one or more applications and including a time of completion being that of the given time;

initiating another call to the APIs of the remote computing devices to retrieve other data about tasks that have been completed by other users from the one or more applications;

analyzing the retrieved other data to identify at least one of the completed tasks as being similar to the at least one of the generated tasks, based on comparing task descriptions and completion times of the at least one of the completed tasks and the at least one of the generated tasks; and initiating an update to at least one of the one or more applications using the retrieved data, so that at least one of the generated tasks is completed before or at the given time, wherein the initiation of the update to the at least one of the one or more applications is based on identifying another user who completed the at least one completed task similar to the at least one generated task, based on the comparison of the task descriptions and the completion times.

18. The non-transitory machine-readable medium of claim 17, wherein the determination of the potential for the one or more tasks not to be completed at the given time includes receiving information about a time off request made by a user.

19. The non-transitory machine-readable medium of claim 17, wherein the initiation of the update to the at least one of the one or more applications includes reassigning the at least one of the generated tasks.

20. The non-transitory machine-readable medium of claim 17, wherein the initiation of the update to the at least one of the one or more applications includes providing a recommendation to reassign the at least one of the generated tasks.

* * * * *